United States Patent
Kang et al.

(10) Patent No.: US 12,017,286 B2
(45) Date of Patent: Jun. 25, 2024

(54) AUTOMATIC HOLE-PROCESSING METHOD WITH SELF-ADAPTING ADJUSTMENT OF PROCESSING PARAMETERS

(71) Applicant: DALIAN UNIVERSITY OF TECHNOLOGY, Liaoning (CN)

(72) Inventors: Renke Kang, Liaoning (CN); Zhigang Dong, Liaoning (CN); Guolin Yang, Liaoning (CN); Xianglong Zhu, Liaoning (CN); Chao Yan, Liaoning (CN); Yu Gao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 638 days.

(21) Appl. No.: 17/214,750

(22) Filed: Mar. 26, 2021

(65) Prior Publication Data
US 2021/0229188 A1 Jul. 29, 2021

Related U.S. Application Data

(63) Continuation-in-part of application No. PCT/CN2018/113849, filed on Nov. 3, 2018.

(30) Foreign Application Priority Data

Sep. 26, 2018 (CN) .......................... 201811126147.X
Sep. 26, 2018 (CN) .......................... 201811126903.9

(51) Int. Cl.
*B23B 35/00* (2006.01)
*B23B 49/00* (2006.01)
*G05B 19/4155* (2006.01)

(52) U.S. Cl.
CPC .............. *B23B 35/00* (2013.01); *B23B 49/00* (2013.01); *G05B 19/4155* (2013.01); *G05B 2219/36292* (2013.01)

(58) Field of Classification Search
CPC ... B23B 35/00; B23B 2270/486; B23Q 15/12; G05B 2219/36292; G05B 2219/50107; G05B 2219/45129
See application file for complete search history.

(56) References Cited

U.S. PATENT DOCUMENTS

| | | | |
|---|---|---|---|
| 5,507,603 A | 4/1996 | Nakano et al. | |
| 2010/0025107 A1* | 2/2010 | Merkley | B23B 35/00 175/24 |
| 2017/0205334 A1 | 7/2017 | Briese et al. | |

FOREIGN PATENT DOCUMENTS

| | | |
|---|---|---|
| CN | 101670448 A | 3/2010 |
| CN | 103894657 A | 7/2014 |

(Continued)

*Primary Examiner* — Alan Snyder
(74) *Attorney, Agent, or Firm* — NKL Law; Allen Xue

(57) ABSTRACT

Disclosed is an automatic hole-processing method with self-adapting adjustment of processing parameters, including the following steps: performing tool feeding, detecting whether the rotate speed changes or not, if changes, judging the type of the processing material according to the new rotate speed after stabilization (if not, the tool feeding is continued); feeding the tool according to the processing parameters suitable for the material, detecting whether the rotate speed changes or not, if changes, judging whether the hole processing has been completed or not according to the new rotate speed after stabilization (if not, the tool feeding is continued), if completed, retracting the tool with the set parameters (if not, judging the type of the processing material according to the new rotate speed after stabilization, and repeating the above steps), completing the hole processing. During the hole processing in the present disclosure, there is no need to know the type of workpiece material of each processing hole in advance and to set processing parameters for each material respectively; there is no need for axial tool setting, processing parameters can be changed automatically (Continued)

after the tool contacts the workpiece; there is no need to know the total thickness of each processing hole material in advance and to set the feed stokes respectively, after cutting through the workpiece, the tool automatically identifies and begins to retract.

10 Claims, 2 Drawing Sheets

(56) References Cited

FOREIGN PATENT DOCUMENTS

| | | |
|---|---|---|
| CN | 104289738 A | 1/2015 |
| CN | 104759658 A | 7/2015 |
| JP | 2007118157 A | 5/2007 |

* cited by examiner

AUTOMATIC HOLE-PROCESSING METHOD WITH SELF-ADAPTING ADJUSTMENT OF PROCESSING PARAMETERS

TECHNICAL FIELD

The present disclosure belongs to the technical field of hole processing in aerospace vehicle assembly, in particular to an automatic hole-processing method with self-adapting adjustment of processing parameters.

BACKGROUND

In aerospace vehicles, a large number of hard-to-process materials such as composite, aluminum alloy, titanium alloy, and high-strength steel are used, as well as different forms of laminated structures composed of more than two kinds of materials. There are a large number of hole processing requirements in the assembly process of aircraft structural parts. Compared with monolayer material, the material and structural characteristics of laminated structural parts of aerospace vehicle make it more difficult to process, which puts forward higher requirements for hole processing technology. A large number of pneumatic processing apparatuses are used in automatic hole processing of aircraft assembly, including automatic feed drilling using pneumatic spindle or pneumatic motor, portable helical milling unit, hole processing end effector, etc. The characteristics of pneumatic tool are that the spindle rotate speed cannot be accurately controlled, and the spindle rotate speed changes with the change of external load. These processing apparatuses lack the self-identification function of the processing materials, causing difficulties for assembling and hole processing, mainly in the following aspects: (1) The suitable processing parameters of different materials are different. If different processing parameters are used for each material, the programming and parameter setting of the processing apparatus will be very tedious; if all materials use the same processing parameters, only one processing parameter with the lowest feed speed can be set according to the material with the worst manufacturability, so as to ensure that the cutting process can be carried out smoothly and the processing quality meets the requirements when the hole processing tool cuts into any material with this processing parameter, which results in waste of processing time and reduction of production efficiency for processing other materials suitable for high feed speed. (2) The thickness of processing material is different at different hole processing positions. If different hole processing depth is set for each processing position, the programming and parameter setting of the processing equipment will be very tedious; if the same hole processing depth is set for all positions, the maximum hole processing depth can be set only according to the thickest part of the material, so as to ensure that each processing position of the workpiece material is processed thoroughly, which results in waste of processing time and reduction of production efficiency for processing other materials with small thickness. (3) During hole processing, there are errors between the actual thickness and the theoretical value of the material, and there are also errors between the distance, between the hole processing tool and the workpiece material, and the actual value; and these errors bring two aspects of influence: On the one hand, it increases the difficulty of axial tool setting; on the other hand, in order to ensure that each group of workpiece materials are processed thoroughly, the set total stroke of hole processing must be extra increased a little bit, so that there is a large feed idle stroke in the processing process, which extra wastes processing time and reduces production efficiency.

SUMMARY OF THE INVENTION

In view of the problems in the prior art, the present disclosure proposes an automatic hole-processing method with self-adapting adjustment of processing parameters by utilizing the characteristic that the rotate speed of the tool driving device (pneumatic motor or pneumatic spindle) changes with change of the load when working. Differences in cutting properties of different laminated materials lead to the change of processing load when cutting tool passes through the interface, and the change of processing load will affect the rotate speed of pneumatic tools. By monitoring the rotate speed of the tool driving device, the interface of the laminated structure is judged and the hole processing parameters are changed to realize the high efficiency and precision hole processing of the laminated structure. The said interface includes not only the transition interface of different materials with laminated structure, but also the upper surface of the workpiece (that is the entrance of the processing hole), and the lower surface of the workpiece (that is the exit of the processing hole). The technical solutions adopted by the present disclosure are as follows: An automatic hole-processing method with self-adapting adjustment of processing parameters, including the following steps:

S1. starting a hole-processing apparatus, a tool on the apparatus carrying out a hole processing on a workpiece;

S2. the tool rotating itself at a high speed, and forward feeding the tool with set processing parameters;

S3. while forward feeding the tool, monitoring a rotate speed change of a tool driving device by using a sensor; if the rotate speed of the driving device changes, performing step S4; and if the rotate speed of the driving device does not change, performing step S2;

S4. according to a new rotate speed after stabilization of the tool driving device, a controller judging a type of processing material of the workpiece, and automatically adjusting the processing parameters to adapt to the processing of the material;

S5. the tool continuing to forward feed to process holes;

S6. while forward feeding the tool, monitoring the rotate speed change of the tool driving device by using the sensor; if the rotate speed of the driving device changes, performing step S7; and if the rotate speed of the driving device does not change, performing step S5;

S7. the controller judging whether the hole-processing process has been completed or not according to the new rotate speed after stabilization of the tool driving device, if the hole-processing process has been completed, performing step S8; and if the hole-processing process has not been completed, then performing step S4; and S8. retracting the tool with the set processing parameters to complete the hole-processing.

In step S4, the specific steps for judging the type of the processing material according to the new rotate speed after stabilization are as follows:

the sensor measuring a real-time rotate speed $n_a$, the controller comparing the collected new rotate speed $n_a$ after real-time stabilization of the tool driving device with $n_0$ and $n_i$ one by one, automatically finding a value closest to $n_a$; if the value closest to $n_0$, the tool has not yet contacted the workpiece; and if the value closest to a certain value of $n_i$, the hole-processing apparatus is processing the workpiece material corresponding to m at this time;

wherein, $n_0$ and $n_i$ can be obtained according the following steps:

S41. starting the hole-processing apparatus, the tool driving device rotating without load, the sensor measuring and recording a no-load rotate speed $n_0$ of the driving device at this time;

S42. applying a variable and measurable torque on an output end of the tool driving device, starting the tool driving device to make it rotate, constantly adjusting a size of the applied torque, the sensor measuring the rotate speed n of the tool driving device corresponding to different torques, drawing a rotate speed-torque characteristic curve of the tool driving device according to the measured experimental data, and carrying out a mathematical function fitting to obtain a function $T_d = f(n)$, which is a function expression of an output torque $T_d$ of the tool driving device with respect to the rotate speed n of the tool driving device;

S43. establishing a torque prediction model of the tool driving device in the process of hole-processing by using a cutting force model, obtaining a calculation equation $T_d = g(n,m,k)$ of the torque, wherein m is a coefficient related to the processing material, and k is other processing parameters except the rotate speed of the tool driving device;

S44. combining the function $T_d = f(n)$ obtained in step S42 and the function $T_d = g(n,m,k)$ obtained in step S43 to obtain an equation $f(n) = g(n,m,k)$;

S45. before hole processing, counting up all the workpiece materials involved in the processing, determining corresponding coefficient $m_i$ (i=1, 2, 3 ... ) for each material and other parameters except the rotate speed of the tool driving device, to obtain a corresponding coefficient of $k_a$ at this time; and S46. substituting $k=k_a$ and $m_i$ into the equation $f(n)=g(n,m,k)$ in step S44 to solve the rotate speed $n_i$ (i=1, 2, 3 ... ) of the tool driving device corresponding to different materials, and inputting the rotate speed m of the tool driving device corresponding to different materials into the controller.

Steps S41 to S46 also can be performed before step S1 or step S4.

The tool driving device is a pneumatic spindle or a pneumatic motor.

A method for setting the processing parameters in step S2 is: through the tests and the experience of operating personnel, setting a set of processing parameters of lower feed speed, ensuring that the cutting process can be carried out smoothly and the processing quality can meet the requirements when the tool cutting into any material with the processing parameters.

In steps S3 and S6, a change of the rotate speed of the tool driving device refers to a stable and larger change, excluding the small fluctuation change of the rotate speed of the tool driving device caused by barometric fluctuation of the supply compressed air or the instability of the processing state.

A method for judging whether the hole-processing process has been completed or not according to the new rotate speed after the tool driving device is stable in step S7: during hole processing, the sensor measuring the real-time rotate speed $n_a$ of the driving device, the controller comparing the collected new rotate speed $n_a$ after the stabilization of the tool driving device in real time with $n_0$; if the value closest to $n_0$, the tool has cut through the workpiece, and the tool is no longer contacted to the workpiece, the hole processing has been completed, and the tool driving device returns to the no-load state.

A method for setting the processing parameters in step S8 is: through the tests and the experience of operating personnel, setting a set of processing parameters of higher feed speed, shortening the tool retracting time as far as possible and ensuring that there is no serious decline in the processing quality of the processed surface in the tool retracting.

The rotate speed-torque characteristic curve of the tool driving device obtained in step S42 also can be obtained by carrying out a processing test of variable parameter hole-processing; during the processing test, fixing the workpiece on a dynamometer which can measure the torque in processing, starting the hole-processing apparatus to carry out the processing test with different parameters, and recording the torques measured by the dynamometer with different parameters and the rotate speeds of the driving device, so as to obtain the rotate speed-torque characteristic curve of the tool driving device.

In step S43, m is an array whose definition is determined according to the selected cutting force model; k is an array, including a tool diameter, an eccentricity, a feed speed, a revolution speed, etc.

In step S45, $m_i$ is obtained through a cutting force coefficient calibration test or accessing to information.

In step S43, the torque of tool driving device during hole processing can also be obtained by a finite element compute simulation method.

In step S46, a solution of the equation can be carried out with the help of a computer through mathematical software, such as MATLAB.

The hole-processing apparatus includes but not limited to automatic feed drilling, portable helical milling hole unit and hole processing end effector, etc.

The pneumatic motor is provided with a spindle of hole-processing apparatus connected with the tool.

The pneumatic spindle is provided with the tool.

The hole-processing apparatus includes a plurality of pneumatic motors or pneumatic spindles.

The pneumatic motor and the pneumatic spindle are blade type, turbo type and other forms, driven by compressed air.

The input rotate speed of the pneumatic motor and the pneumatic spindle decreases with the increase of the load when the supply compressed air pressure is constant.

The feed speed of the tool can be adjusted timely and be controlled by the controller.

The hole-processing apparatus assembles the sensor for detecting the real-time rotate speed of the tool driving device, and transmits the rotate speed information to the controller.

The workpiece is monolayer material structure or laminated material structure composed of different materials, such as carbon fiber reinforced resin matrix composite, aluminum alloy, titanium alloy, high-strength steel material monolayer or laminated structure composed of more than two materials.

The tool includes but not limited to drill bit, milling cutter, reaming tool, boring tool, coun-tersink drill, trepanning drill, etc.

The sensor includes but not limited to encoder, circular grating, magnetic grid, Hall element, etc.

The sensor can come with the hole-processing apparatus, or can be additionally installed to realize the present disclosure.

The processing parameters include but not limited to axial feed speed, revolution speed, air inlet pressure of pneumatic motor, whether using central cooling or not, whether using peck drilling or not, etc.

The controller includes but not limited to PLC (programmable logic controller), industrial personal computer, CNC (computer numerical control), single-chip microcomputer, etc.

Compared with the prior art, the present disclosure has the following beneficial effects:

1. The operational process of hole-processing is simplified. When the present disclosure is used to process holes, first of all, the operator does not need to know the type of workpiece material of each processing hole in advance, and the processing parameters for each material do not need to be set respectively; secondly, there is $n_0$ need for axial tool setting, and the processing parameters can be changed automatically after the tool contacts the workpiece; once more, there is $n_0$ need to know the total thickness of material of each processing hole and to set the feed stokes respectively in advance, after cutting through the workpiece, after cutting through the workpiece, the tool automatically identifies and starts to retract.

2. The processing time is shortened. When using the present disclosure for hole processing, each material can be processed at a suitable maximum feed speed, shortening the processing time; and the parameters automatically changes after the tool cutting into the workpiece, and automatically retracts after cutting through the workpiece, avoiding the empty stroke and improving the production efficiency.

Based on the above reasons, the present disclosure can be widely popularized in the field of hole-processing technology in aerospace vehicle assembly.

BRIEF DESCRIPTION OF THE DRAWINGS

In order to more clearly illustrate the embodiments of the present disclosure or the technical solutions in the prior art clearer, the drawings required in the description of the embodiments or the prior art will be briefly introduced below. Obviously, the drawings in the following descriptions are some embodiments of the present disclosure. For those of ordinary skilled in the art, other drawings can be obtained based on these drawings without inventive effort.

DETAILED DESCRIPTION OF THE EMBODIMENTS

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. The following description of at least one exemplary embodiment is actually only illustrative, and in $n_0$ way serves as any limitation on the present invention and its application or use. Based on the embodiments of the present disclosure, all the other embodiments obtained by those of ordinary skill in the art without inventive effort are within the protection scope of the present disclosure.

Figure 1:
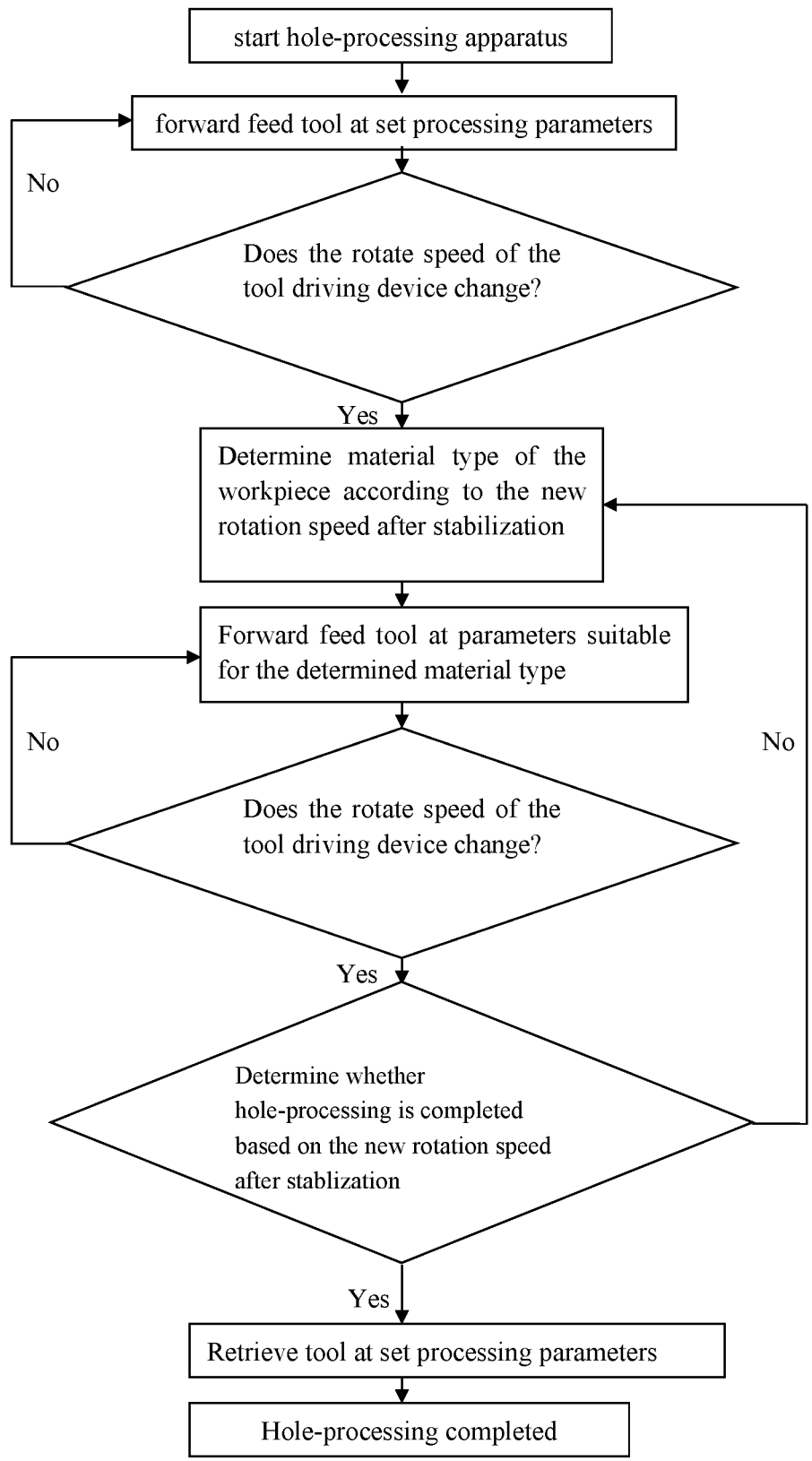
FIG. 1 is a flow diagram of an automatic hole processing method with self-adapting adjustment of processing parameters in the embodiments of the present disclosure.

As shown in FIG. 1, an automatic hole-processing method with self-adopting adjustment of processing parameters is suitable for hole processing of monolayer material, and also suitable for the laminated structure composed of different materials, such as carbon fiber reinforced resin matrix composite, aluminum alloy, titanium alloy, high-strength steel of material monolayer or a laminated structure composed of more than two materials of that. The direction terms mentioned in the present disclosure, such as "up, down, left, right", are only directions of the accompanying drawings. Therefore, the direction terms are used to illustrate the present disclosure without limitation.

The present disclosure mainly utilizes the characteristic that the output rotate speed of the tool driving device (pneumatic motor or pneumatic spindle) decreases with the increase of the load when the supply compressed air pressure is at a certain value. During hole processing, before the tool contacting the workpiece or after cutting through the workpiece, the tool driving device is in a $n_0$-load state and the output rotate speed is the highest; and when the materials to-be-processed are different, the cutting force is different, the load on the tool driving device is different, so the rotate speed is different and is lower than the no-load rotate speed. According to the rotate speed after the stabilization of the tool driving device, it's can be judged that whether the current state is in a no-load state or not and which kind of material is being processed.

An automatic hole-processing method with self-adapting adjustment of processing parameters, including the following steps:

S1. starting a hole-processing apparatus, and a tool on the apparatus carrying out a hole processing on a workpiece;

S2. the tool rotating itself at a high speed, and forward feeding the tool with set processing parameters;

S3. while forward feeding the tool, monitoring a change of the rotate speed a tool driving device by using a sensor; if the rotate speed of the driving device changes, performing step S4; and if the rotate speed of the driving device does not change, performing step S2;

S4. according to a new rotate speed after stabilization of the tool driving device, a controller judging a type of processing material of the workpiece, and automatically adjusting the processing parameters to adapt to the processing of the material;

S5. the tool continuing to forward feed to process hole;

S6. while forward feeding the tool, monitoring the change of the rotate speed of the tool driving device by using the sensor; if the rotate speed of the driving device changes, performing step $7; and if the rotate speed of the driving device does not change, performing step S5;

S7. the controller judging whether the hole-processing process has been completed or not according to the new rotate speed after stabilization of the tool driving device; if the hole-processing process has been completed, performing step S8, and if the hole-processing process has not been completed, performing step S4; and S8. retracting the tool with the set processing parameters to complete the hole processing.

In step S4, the steps for judging the type of the processing material according to the new rotate speed after stabilization of the tool driving device are as follows:

the sensor measuring a real-time rotate speed $n_a$, the controller comparing the collected new rotate speed $n_a$ after real-time stabilization of the tool driving device with $n_0$ and $n_i$ one by one, automatically finding a value closet to $n_a$; if the value closet to $n_0$, the tool has not yet contacted the workpiece; and if the value closet to a certain value $n_i$, the hole-processing apparatus is processing the workpiece material corresponding to $n_i$ at this time;

wherein, $n_0$ and $n_i$ can be obtained according to the following steps:

S41. starting the hole processing apparatus, the tool driving device rotating without load, and the sensor measuring and recording a $n_0$-load rotate speed $n_0$ of the driving device at this time;

S42. applying a variable and measurable torque on an output end of the tool driving device, the staring the tool driving device to make it rotate, constantly adjusting a size of the applied torque, the sensor measuring a rotate speed n of the tool driving device corresponding to different torques, drawing a rotate speed-torque characteristic curve of the tool driving device according to the measured experimental data, and carrying out a mathematical function fitting to obtain a function $T_d=f(n)$, which is a function expression of an output torque Ta of the tool driving device with respect to the rotate speed n of the tool driving device;

S43. establishing a torque prediction model of the tool driving device in the process of hole-processing by using a cutting force model, obtaining a calculation equation $T_d=g(n,m,k)$ of the torque, wherein m is a coefficient related to the processing material, and k is other processing parameters except the rotate speed of the tool driving device;

S44. combining the function $T_d=f(n)$ obtained in step S42 and the function $T_d=g(n,m,k)$ obtained in step S43 to obtain an equation $f(n)=g(n,m,k)$;

S45. before hole processing, counting up all the workpiece materials involved in the processing, determining corresponding coefficient $m_i$(i=1, 2, 3 . . . ) for each material and other parameters except the rotate speed of the tool driving device, to obtain a corresponding coefficient $k_a$ at this time; and S46. substituting k $k_a$ and $m_i$ into the equation $f(n)=g(n,m,k)$ in step S44 to solve the rotate speed $n_i$ (i=1, 2, 3 . . . ) of the tool driving device corresponding to different materials, and inputting the rotate speed $n_i$ of the tool driving device corresponding to different materials into the controller.

Steps S41 to S46 also can be performed before step S1 or step S4.

Embodiment 1

An automatic hole-processing method with self-adapting adjustment of processing parameters, the workpiece to-be-processed is a laminated structure of carbon fiber reinforced resin matrix composite and titanium alloy material, the hole-processing apparatus is a portable helical milling unit, and the hole-processing tool is a helical milling cutter. The method has the following steps:

S1. the portable helical milling device is started, the tool driving device rotates without load, the portable helical milling device integrated with an encoder for measuring the rotate speed of the tool driving device, measuring and recording the no-load rotate speed $n_0$ of the tool driving device at this time.

S2. a torque sensor and a damper are connected in series on the output end of the tool driving device of the portable helical milling device; the tool driving device of the portable helical milling device is started to make it rotate, and the damper is constantly adjusted to change the applied load, the accurate value of the output torque of the tool driving device at this time is measured by the torque sensor, and the encoder the portable helical milling device comes with is used to measure the rotate speed n of the tool driving device corresponding to different torques. According to the measured experimental data, the rotate speed-torque characteristic curve of the tool driving device of the portable helical milling device is drawn, and the mathematical function fitting is carried out to obtain a function $T_d=f(n)$, which is a function expression of the output torque Ta of the tool driving device with respect to the rotate speed n of the tool driving device.

S3. the cutting force model is used to establish the torque prediction model of the tool driving device in the helical milling process, and a calculation equation $T_d=g(n,m,k)$ of the torque is deduced, wherein m is a coefficient related to the processing material, and k is other processing parameters except the rotate speed of the tool driving device.

The cutting force model is an cutting force analytical model based on the micro-element on the cutting edge of the helical milling cutter.

Figure 2:
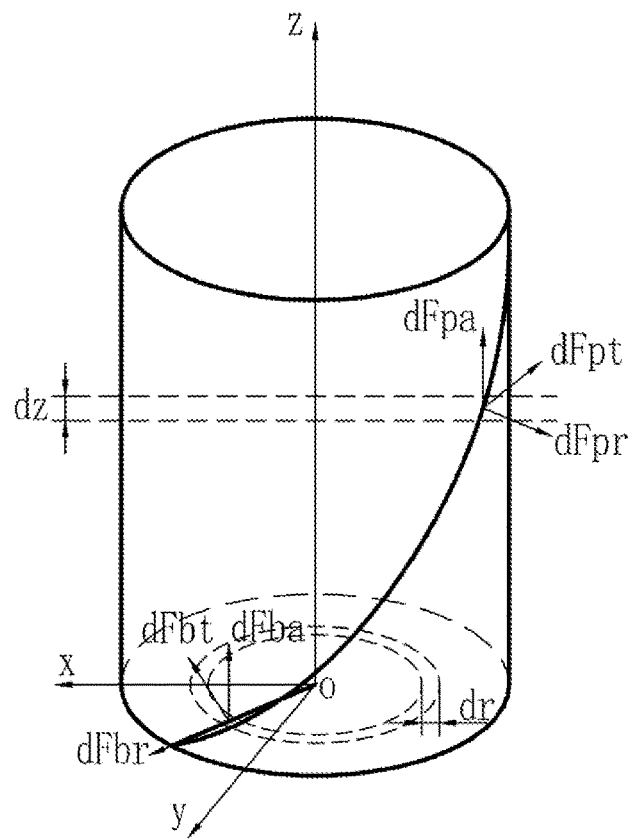
FIG. 2 is a schematic diagram of the cutting force analytical model based on the micro-element on the cutting edge of a helical milling cutter in embodiment 1 of the present disclosure.

As shown in FIG. 2, the formulas of the cutting force analytical model are as follows:

The tangential cutting force $dF_{pt}$, the radial cutting force $dF_{pr}$ and the axial cutting force $dF_{pa}$ of an infinitesimal on a circumferential edge, and the tangential cutting force $dF_{bt}$, the radial cutting force $dF_{br}$ and the axial cutting force $dF_{ba}$ of an infinitesimal on an end edge are respectively obtained. The analytical models of the infinitesimal cutting force on the circumferential edge and the end edge can be respectively expressed as follows:

$$\begin{cases} dF_{pt} = K_{tcp}h_p dz + K_{tep}dz \\ dF_{pr} = K_{rcp}h_p dz + K_{rep}dz \\ dF_{pa} = K_{acp}h_p dz + K_{aep}dz \end{cases}$$

$$\begin{cases} dF_{bt} = K_{tcb}h_b dr + K_{teb}dr \\ dF_{br} = K_{rcb}h_b dr + K_{reb}dr \\ dF_{ba} = K_{acb}h_b dr + K_{aeb}dr \end{cases}$$

wherein, $K_{tcp}$, $K_{rcp}$ and $K_{acp}$ represent the action coefficients of tangential, radius and axial force due to the deformation action on the circumferential edge; $K_{tep}$, $K_{rep}$ and $K_{aep}$ represent the action coefficients of tangential, radius and axial force due to the friction action on the circumferential edge; $K_{tcb}$, $K_{rcb}$ and $K_{acb}$ represent the action coefficients of tangential, radius and axial force due to the deformation action on the end edge; $K_{teb}$, $K_{reb}$ and $K_{aeb}$ represent the action coefficients of tangential, radius and axial force due to the friction action on the end edge; $h_p$ and $h_b$ respectively represent the thickness of the undeformed chip on the current circumferential edge and end edge; and $d_z$ and $d_r$ respectively represent the width of the infinitesimal on the circumferential edge and the end edge.

The m is the coefficient related to the processing material, including the action coefficients $K_{tcp}$ and $K_{tcb}$ of the tangential force produced by the deformation action on the circumferential edge and the end edge respectively, and the action coefficients $K_{tep}$ and $K_{reb}$ of the tangential force produced by the friction action on the circumferential edge and the end edge respectively, which is calibrated by cutting force experiment, and expressed as:

$m=\{K_{tcp}, K_{tep}, K_{tcb}, K_{teb}\}$

The k is other processing parameters except the rotate speed of the tool driving device, including the diameter $D_c$ of the helical milling cutter, the teeth number N of the helical milling cutter, the helical angle β of the helical milling cutter, the eccentricity e, the feed speed $f_a$ and the revolution speed $n_p$, which is expressed as:

$$k=\{D_c, N, \beta, e, f_a, n_p\}.$$

The calculation equation of the thickness $h_p$ of the undeformed cutting chip of the infinitesimal on the circumferential edge is:

$$h_p = f_{zt} \sin(\varphi_i),$$

wherein the calculation equation of the tangential feeding amount per teeth $f_{zt}$ is:

$$f_{zt} = \frac{2\pi e \cdot n_p}{n \cdot N},$$

The calculation equation of the instantaneous working pressure angle $\varphi_i$ of the $i^{th}$ cutting edge is:

$$\varphi_i = (i-1) \cdot \varphi_p - \frac{2\tan\beta}{D_c} \cdot i \cdot dz,$$

wherein, $\varphi_i$ is a tooth spacing angle of the helical milling cutter, and $\varphi_p = 2\pi/N$.

The calculation equation of the thickness $h_b$ of the undeformed cutting chip of the infinitesimal on the end edge is:

$$h_b = f_{za},$$

wherein the calculation equation of the axial feeding amount per teeth of $f_{za}$ is:

$$f_{za} = \frac{f_a}{n \cdot N},$$

The equation deducing the torque equation $T_d = g(n,m,k)$ is as follows:

In the process of helical milling, among the cutting force generated by the circumferential edge, the tangential cutting force $dF_{pt}$ contributes to the torque generation, the above formulas are substituted into the expression of the tangential cutting force $dF_{pt}$ of the circumferential edge infinitesimal of the helical milling, and the torque $dT_p$ generated by the tangential cutting force $dF_{pt}$ of the circumferential edge infinitesimal is obtained and expressed as:

$$dT_p = \left(K_{tcp} \frac{2\pi e \cdot n_p}{n \cdot N} \sin\left((i-1) \cdot \frac{2\pi}{N} - \frac{2\tan\beta}{D_c} \cdot i \cdot dz\right) + K_{tep}\right) \times R_c dz.$$

In the process of helical milling, among the cutting force generated by the end edge, the tangential cutting force $dF_{bt}$ contributes to the torque generation, the above formulas are substituted into the expression of the tangential cutting force $dF_{bt}$ of the end edge infinitesimal of the helical milling, and the torque $dT_b$ generated by the tangential cutting force $dF_{bt}$ of the end edge infinitesimal is obtained and expressed as:

$$dT_b = \left(K_{tcb} \frac{f_a}{n \cdot N} + K_{teb}\right) \times r dr,$$

wherein, r is a distance between the infinitesimal on the end edge and the center of the tool.

According to the above calculation results, the calculation model of torque in the helical milling process in a certain processing state is obtained and expressed as:

$$T = \int_0^{a_p} dT_p + \int_0^{R_c} dT_b,$$

wherein, $a_p$ is a lead, and the calculation equation is $a_p = f_a / n_p$.

$dT_p$ and $dT_b$ are respectively substituted into the above equation, and the obtained torque model is a multivariate function, which is expressed as:

$$T = \int_0^{a_p} \left(K_{tcp} \frac{2\pi e \cdot n_p}{n \cdot N} \sin\left((i-1) \cdot \frac{2\pi}{N} - \frac{2\tan\beta}{D_c} \cdot i \cdot dz\right) + K_{tep}\right) \times R_c dz + \int_0^{R_c} \left(K_{tcb} \frac{f_a}{n \cdot N} + K_{teb}\right) \times r dr.$$

By considering all cutter teeth participating in the cutting, the instantaneous moment of force in the global workpiece coordinate system can be expressed as:

$$T_d = g(n, m, k) = \sum_{i=1}^{N} g(\varphi_i) \int_0^{a_p} \left(K_{tcp} \frac{2\pi e \cdot n_p}{n \cdot N} \sin\left((i-1) \cdot \frac{2\pi}{N} - \frac{2\tan\beta}{D_c} \cdot j \cdot dz\right) + K_{tep}\right) \times R_c dz + \sum_{i=1}^{N} \int_0^{R_c} \left(K_{tcb} \frac{f_a}{n \cdot N} + K_{teb}\right) \times r dr,$$

which is the calculation equation of the torque;

wherein g ($\varphi_i$) is a window function, which is used to judge whether the current cutting edge participates in cutting or not; the cutting-in angle of the cutting edge infinitesimal of the helical milling cutter is set as $\varphi_{en}$, and the cutting-out angle is set as $\varphi_{ex}$, and expressed as:

$$g(\varphi_1) = \begin{cases} 1, & \varphi_{en} \leq \varphi_1 \leq \varphi_{ex} \\ 0, & \text{others} \end{cases}.$$

S4. the equation $T_d = f(n)$ obtained in step S2 and the equation $T_d = g(n,m,k)$ obtained in step S3 are combined to obtain an equation $f(n) = g(n,m,k)$, which is expressed as:

$$f(n) = \sum_{i=1}^{N} g(\varphi_i) \int_0^{a_p} \left(K_{tcp} \frac{2\pi e \cdot n_p}{n \cdot N} \sin\left((i-1) \cdot \frac{2\pi}{N} - \frac{2\tan\beta}{D_c} \cdot j \cdot dz\right) + K_{tep}\right) \times R_c dz + \sum_{i=1}^{N} \int_0^{R_c} \left(K_{tcb} \frac{f_a}{n \cdot N} + K_{teb}\right) \times r dr$$

S5. before helical milling processing, for carbon fiber reinforced resin matrix composite and titanium alloy material, the cutting force coefficients are calibrated to obtain the corresponding $\{K_{tcp}, K_{tep}, K_{tcb}, K_{teb}\}$, thus the corresponding coefficients are determined as $m_1$ and $m_2$ respectively. Because the diameter $D_c$ of the helical milling cutter, the teeth number N of the helical milling cutter, the helical angle β of the helical milling cutter, the eccentricity e, the feeding speed $f_a$ and the revolution speed $n_p$ have been determined, $k_a=\{D_c, N, \beta, e, f_a, n_p\}$ is obtained;

S6. $k=k_a$ and $m_1$, $m_2$ are respectively substituted into the equation $f(n)=g(n,m,k)$ in step S4, the rotate speeds of $n_1$ and $n_2$ of the tool driving device corresponding to different materials are solved by computer through mathematical software (such as MATLAB), that is, respectively corresponding to the spindle rotate speeds of carbon fiber reinforced resin matrix composite and titanium alloy; and $n_1$ and $n_2$ are input into the controller;

S7. the portable helical milling unit is started, on which the helical milling cutter is used to process holes for the laminated structure workpiece;

S8. the helical milling cutter rotates at a high speed, forward feeding with the set processing parameters;

S9. while the helical milling cutter forward feeds, the sensor is used to monitor the change of the rotate speed of the tool driving device; if the rotate speed of the tool driving device changes, step S10 is performed; and if the rotate speed of the tool driving device does not change, step S8 is performed;

S10. the sensor measures the new rotate speed $n_a$ of the tool driving device after stabilization, the controller compares the collected new rotate speed $n_a$ after the tool driving device is stable with $n_1$ and $n_2$ in step S6 and $n_0$ in step S1, automatically finds the closest $n_1$ and thereby judges that the processing material at this time is carbon fiber reinforced resin matrix composite, and automatically adjusts the processing parameters to adapt to the processing of the material;

S11. the helical milling cutter continues to forward feed to process hole;

S12. while the helical milling cutter forward feeds, the sensor is used to monitor the change of the rotate speed of the tool driving device; if the rotate speed of the tool driving device changes, step S13 is performed; and if the rotate speed of the tool driving device does not change, step S11 is performed;

S13. the sensor measures the new rotate speed $n'_a$ of the tool driving device after stabilization, the controller compares the collected new rotate speed $n'_a$ after the tool driving device is stable with $n_1$ and $n_2$ in step S6 and $n_0$ in step S1, automatically finds the closest $n_2$ and thereby judges that the processing material at this time is titanium alloy material, and automatically adjusts the processing parameters to adapt to the processing of the material;

S14. the helical milling cutter continues to forward feed to process hole;

S15. while the helical milling cutter forward feeds, the sensor is used to monitor the change of the rotate speed of the tool driving device; if the rotate speed of the tool driving device changes, step S16 is performed; and if the rotate speed of the tool driving device does not change, step S14 is performed;

S16. the sensor measures the new rotate speed $n''_a$ of the tool driving device after stabilization, the controller compares the collected new rotate speed $n''_a$ after the tool driving device is stable with $n_1$ and $n_2$ in step S6 and $n_0$ in step S1, automatically finds the closest $n_0$; at this time, the output rotate speed of the tool driving device is no-load speed, then the hole-processing process is completed, and the controller controls the helical milling cutter to retract the tool with the set processing parameters, and the hole processing process is completed.

Embodiment 2

An automatic hole-processing method with self-adapting adjustment of processing parameters, the workpiece to-be-processed is a laminated structure of carbon fiber reinforced resin matrix composite and titanium alloy material, the hole-processing apparatus is ADU (Advanced Drilling Unit), and the hole processing tool is a twist drill. The method has the following steps:

S1. the ADU is started and the tool driving device rotates without load, the ADU integrated with an encoder for measuring the rotate speed of the tool driving device, measuring and recording the no-load rotate speed $n_0$ of the tool driving device at this time.

S2. a torque sensor and a damper are connected in series on the output end of the tool driving device of the ADU, and the tool driving device of the ADU is started to rotate; the damper is constantly adjusted to change the applied load, the accurate value of the output torque of the tool driving device at this time is measured by the torque sensor, and the encoder the ADU comes with is used to measure the rotate speed n of the tool driving device corresponding to different torques; according to the measured experimental data, the rotate speed-torque characteristic curve of the tool driving device of the ADU is drawn, and the mathematical function fitting is carried out to obtain a function $T_d=f(n)$, which is a function expression of the output torque Ta of the tool driving device with respect to the rotate speed n of the tool driving device.

S3. the cutting force model is used to establish the torque prediction model of the tool driving deice in the drilling process, and a calculation equation of the torque $T_d=g(n,m,k)$ is obtained, wherein m is a coefficient related to the processing material, and k is other processing parameters except the rotate speed of the tool driving device.

The cutting force model is an cutting force analytical model based on the infinitesimal on the cutting edge of the twist drill.

Figure 3:
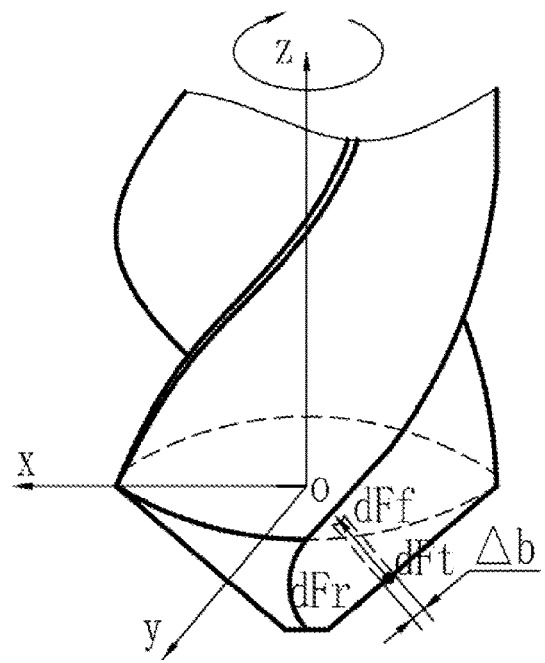
FIG. 3 is a schematic diagram of the analytical model based on the infinitesimal cutting force on the cutting edge of the twist drill in embodiment 2 of the present disclosure.

As shown in FIG. 3, the equation of the cutting force analytical model of the infinitesimal are as follows:

The cutting force of the twist drill is generated by the chisel edge and the primary cutting edge. Since the moment of the force generated by the chisel edge can be ignored, only the primary cutting edge is calculated to obtain the tangential cutting force $dF_t$ and the radial cutting force $dF_f$ of the infinitesimal on the cutting edge, and the cutting force $dF_r$ in the cutting flow direction. The cutting force analytical model of the infinitesimal can be expressed as follows:

$$\begin{cases} dF_t = K_{tc}h\Delta b + K_{te}\Delta b \\ dF_r = K_{rc}h\Delta b + K_{re}\Delta b \\ dF_f = K_{fc}h\Delta b + K_{fe}\Delta b \end{cases}$$

wherein, $K_{tc}$, $K_{rc}$ and $K_{fc}$ represent cutting force coefficients, which are obtained by mathematical formula; $K_{te}$, $K_{re}$ and $K_{fe}$ represent cutting edge force coefficients, which are obtained by experiment; h represents the cutting chip thickness removed by each infinitesimal on the primary cutting edge; and $\Delta b$ represents the cutting chip width removed by each infinitesimal on the primary cutting edge.

The m is the coefficient related to the processing material, including the cutting force coefficient $K_{tc}$ and the cutting edge force coefficient $K_{te}$ in the tangential direction, which is calibrated through mathematical calculation and cutting force experiment and expressed as:

$m=\{K_{tc}, K_{te}\}$

The k is other processing parameters except the spindle rotate speed, including the half peak angle $\kappa_t$ of the twist drill, the feeding rate c when the drill bit feeding into the material, the offset w of the drill core deviating from the axis of the drill bit, the chisel edge angle $\varphi_c$, the length b of the primary cutting edge of the cutting workpiece material, which is expressed as:

$k=\{\kappa_t, c, w, \varphi_c, b\}$

The calculation equation of the cutting chip thickness h removed by each infinitesimal on the primary cutting edge is:

$h=c/2 \sin \kappa_t$

The calculation equation of the cutting chip width $\Delta b$ removed by each infinitesimal on the primary cutting edge is:

$$\Delta b = \frac{dz}{\cos \kappa_t}$$

wherein dz represents the cutting chip height removed by each infinitesimal on the primary cutting edge.

The equation deducing the torque calculation equation $T_d=g(n,m,k)$ is as follows:

During the drilling process, among the cutting force generated by the primary cutting edge, the tangential cutting force of $dF_t$ contributes to the torque generation, the above formulas are substituted into the expression of the tangential cutting force $dF_t$ of the infinitesimal on the drilling hole primary cutting edge, and the torque dT generated by the tangential cutting force $dF_t$ of the infinitesimal on the primary cutting edge is obtained and expressed as:

$dT=dF_t \times r$, wherein r is the radial distance between the infinitesimal and the drill bit axis, expressed as:

$$r = \sqrt{w^2 + [w \cot(\pi - \varphi_c) + z \tan \kappa_t]^2},$$

then, the torque dT generated by the tangential cutting force $dF_t$ of the infinitesimal on the primary cutting edge is:

$$dT = \left(K_{tc} \frac{c \sin \kappa_t}{2 \cos \kappa_t} + \frac{K_{te}}{\cos \kappa_t}\right)\sqrt{w^2 + [w \cot(\pi - \varphi_c) + z \tan \kappa_t]^2} \, dz,$$

wherein z represents the height of the infinitesimal on the primary cutting edge.

According to the above calculation results, the calculation model of the torque in the drilling process under a certain processing state is obtained, which is expressed as:

$$T_d = 2\sum_{m=1}^{M} dT,$$

wherein M is the total number of the infinitesimals on the primary cutting edge, and the equation is $M=b/\Delta b$.

dT is substituted into the above equation, and the obtained torque model is a multivariate function expressed as:

$$T_d = g(n, m, k) = 2\sum_{m=1}^{M}\left(K_{tc} \frac{c \sin \kappa_t}{2 \cos \kappa_t} + \frac{K_{te}}{\cos \kappa_t}\right)\sqrt{w^2 + [w \cot(\pi - \varphi_c) + z \tan \kappa_t]^2} \, dz,$$

which is the deduced calculation equation of the torque;

S4. the equation $T_d=f(n)$ obtained in step S2 and the equation $T_d=g(n,m,k)$ obtained in step S3 are combined to obtain an equation $f(n)=g(n,m,k)$, expressed as:

$$f(n) = 2\sum_{m=1}^{M}\left(K_{tc} \frac{c \sin \kappa_t}{2 \cos \kappa_t} + \frac{K_{te}}{\cos \kappa_t}\right)\sqrt{w^2 + [w \cot(\pi - \varphi_c) + z \tan \kappa_t]^2} \, dz.$$

S5. before drilling, for carbon fiber reinforced resin matrix composite and titanium alloy material, the cutting force coefficients are calibrated respectively to obtain the corresponding $\{K_{tc}, K_{te}\}$, thus the corresponding coefficients are determined as $m_1$ and $m_2$ respectively. Because the half peak angle $\kappa_t$ of the twist drill, the feed rate c when the drill bit feeding into the material, the offset w of the drill core deviating from the axis of the drill bit, the transverse edge angle $\varphi_c$, and the length b of the primary cutting edge of the cutting workpiece material have been determined, the equation $k_a=\{\kappa_t, c, w, \varphi_c, b\}$ is obtained;

S6. $k=k_a$ and $m_1$, $m_2$ are respectively substituted into the equation $f(n)=g(n,m,k)$ in step S4, the rotate speed $n_1$ and $n_2$ of the tool driving device corresponding to different materials are solved by computer through mathematical software (such as MATLAB), that is, respectively corresponding to the spindle rotate speeds of carbon fiber reinforced resin matrix composite and titanium alloy, and $n_1$ md and $n_2$ are input into the controller;

S7. the ADU is started, on which the twist drill is used to process holes for the laminated structure workpiece;

S8. the twist drill rotates at a high speed, forward feeding with the set processing parameters.

S9. while the twist drill forward feeds, the sensor is used to monitor the change of the rotate speed of the tool driving device; if the rotate speed of the tool driving device changes, step S10 is performed; and if the rotate speed of the tool driving device does not change, step S8 is performed;

S10. the sensor measures the new rotate speed $n_a$ of the tool driving device after stabilization, the controller compares the collected new rotate speed $n_a$ after the tool driving device is stable with $n_1$ and $n_2$ in step S6 and $n_0$ in step S1, automatically finds the closest $n_1$ and thereby judges that the processing material at this time is carbon fiber reinforced resin matrix composite, and automatically adjusts the processing parameters to adapt to the processing of the material;

S11. the twist drill continues to forward feed to process hole;

S12. while twist drill forward feeds, the sensor is used to monitor the change of the rotate speed of the tool driving device; if the rotate speed of the tool driving device changes, step S13 is performed; and if the rotate speed of the tool driving device does not change, step S11 is performed;

S13. the sensor measures the new rotate speed $n'_a$ of the tool driving device after stabilization, the controller compares the collected new rotate speed $n'_a$ after the tool driving device is stable with $n_1$ and $n_2$ in step S6 and $n_0$ in step S1, automatically finds the closest $n_2$ and thereby judges that the processing material at this time is titanium alloy material, and automatically adjusts the processing parameters to adapt to the processing of the material;

S14. the twist drill continues to forward feed to process hole;

S15. while the twist drill forward feeds, the sensor is used to monitor the change of the rotate speed of the tool driving device; if the rotate speed of the tool driving device changes, step S16 is performed; and if the rotate speed of the tool driving device does not change, step S14 is performed.

S16. the sensor measures the new rotate speed $n''_a$ of the tool driving device after stabilization, the controller compares the collected new rotate speed $n''_a$ after the tool driving device is stable with $n_1$ and $n_2$ in step S6 and $n_0$ in step S1, and automatically finds the closest $n_0$; at this time, the output rotate speed of the tool driving device is no-load speed, then the hole-processing process is completed, and the controller controls the helical milling cutter to retract the tool with the set processing parameters, and the hole processing process is completed.

Finally, it should be noted that the above embodiments are only used to illustrate the technical solutions of the present disclosure without limiting; although the present disclosure is described in detail with reference to some embodiments, the ordinary skilled in the art should understand that they may still make amendments to the technical solutions disclosed in the embodiments, or make equal replacements for some or all of their technical characteristics; these amendments or replacements do not remove the essence of the corresponding technical solutions from the scope of the technical solutions of the present disclosure.

The invention claimed is:

1. An automatic hole-processing method with self-adapting adjustment of processing parameters, comprising the following steps:
    S1. starting a hole-processing apparatus having a tool configured to drill a hole on a workpiece;
    S2. causing the tool to rotate using a tool driving device and forward feeding the tool with predetermined processing parameters;
    S3. while forward feeding the tool, monitoring the rotation speed of the tool driving device by using a sensor; when the rotation speed of the driving device changes, performing step S4; and when the rotation speed of the driving device does not change, performing step S2;
    S4. determining a material of the workpiece based on the rotation speed of the driving device, and automatically adjusting the processing parameters to adapt to the material of the workpiece;
    S5. continuing forward feeding the tool to process the hole;
    S6. continuing monitoring the rotation speed of the driving device, when the rotation speed of the driving device changes, performing step S7; and when the rotation speed of the driving device does not change, performing step S5;
    S7. determining whether the hole-processing process has been completed based on the rotation speed of the driving device, when the hole-processing process has been completed, performing step S8; and when the hole-processing process has not been completed, performing step S4; and
    S8. retracting the tool,
    wherein in step S4, determining the material of the workpiece based on the rotation speed comprises the steps of:
    S41. determining a no-load rotation speed of the driving device $n_0$ when the tool rotates without contacting the workpiece;
    S42. applying a variable torque on an output end of the driving device, causing the driving device to rotate, adjusting the applied torque while measuring the rotation speed n of the tool driving device corresponding to the variable torque, establishing by curve-fitting a mathematical function $T_d=f(n)$, wherein an output torque of the tool driving device $T_d$ correlates with the rotation speed of the driving device n;
    S43. establishing a torque prediction model of $T_d=g(n,m,k)$, wherein m is a coefficient related to the workpiece material, and k is an array of parameters selected from a tool diameter, an eccentricity, a feed speed, a revolution speed;
    S44. combining the function $T_d=f(n)$ obtained in step S42 and the function $T_d=g(n,m,k)$ obtained in step S43 to obtain an equation $f(n)=g(n,m,k)$;
    S45. determining initial coefficients $m_i$ that correspond to all materials in the to-be-processed workpiece, i being a positive integer, and initial coefficient $k_a$ corresponding to $m_1$; and
    S46. substituting $k=k_a$ and $m=m_1$ into the equation $f(n)=g(n,m,k)$ in step S44 to obtain the rotation speed of the driving device $n_i$ and inputting $n_i$ into the controller.

2. The method according to claim 1, wherein the driving device is a pneumatic spindle or a pneumatic motor.

3. The method according to claim 1, wherein the predetermined process parameters enable processing of a monolayer workpiece composed of a material selected from carbon fiber reinforced resin matrix composite, aluminum alloy, titanium alloy, and high-strength steel material monolayer or a laminated workpiece composed of two or more materials selected from carbon fiber reinforced resin matrix composite, aluminum alloy, titanium alloy, and high-strength steel.

4. The method according to claim 1, wherein in steps S3 and S6, a change of the rotation speed of the tool driving device is not caused by barometric fluctuation of a compressed air or an instability of the processing state.

5. The method according to claim 1, wherein in step S7, the sensor measuring the real-time rotation speed $n_a$ of the driving device, the controller compares the collected new rotation speed $n_a$ with $n_0$ when a different between $n_a$ and $n_0$ is the smallest, the tool has cut through the workpiece, and the hole processing has been completed.

6. The method according to claim 1, wherein in step S42, the workpiece is affixed to a dynamometer, the dynamometer measures the torque during processing the workpiece and records the torques measured at a plurality of processing parameters and the rotation speeds of the driving device, so as to obtain a rotation speed-torque characteristic curve of the driving device for curve fitting.

7. The method according to claim 1, wherein in step S43, m is an array whose definition is determined according to a cutting force model.

8. The method according to claim 1, wherein in step S45, $n_1$ is obtained through a cutting force coefficient calibration test.

9. The method according to claim 1, wherein in step S43, the torque of the driving device during hole processing is obtained by a finite element compute simulation method.

10. The method according to claim 1, wherein in step S46, the equation $f(n)=g(n,m,k)$ is solved using a mathematical software.

* * * * *